United States Patent [19]

Marks

[11] Patent Number: 4,631,353
[45] Date of Patent: Dec. 23, 1986

[54] TERMINAL PEDESTAL FOR BURIED CABLE INSTALLATION

[75] Inventor: Robert J. Marks, Carpentersville, Ill.

[73] Assignee: Reliance Electric Company, Cleveland, Ohio

[21] Appl. No.: 666,760

[22] Filed: Oct. 31, 1984

[51] Int. Cl.⁴ .............................................. H02G 9/02
[52] U.S. Cl. .................................... 174/16 R; 174/38; 220/18; 220/366
[58] Field of Search .................... 174/16 R, 37, 38, 58, 174/59, 60; 220/3.3, 18, 366; 232/19, 20, 22, 23; 361/369

[56] References Cited

U.S. PATENT DOCUMENTS

| | | | |
|---|---|---|---|
| 2,182,603 | 12/1939 | Walker et al. | 361/369 |
| 3,868,474 | 2/1975 | Bunten | 174/38 |
| 3,991,264 | 11/1976 | Connell | 174/38 |
| 4,058,670 | 11/1977 | Leschinger | 174/38 |
| 4,102,475 | 7/1978 | Kalvaitis | 220/366 |
| 4,540,846 | 9/1985 | Smith | 174/38 |

OTHER PUBLICATIONS

Reliable Electric CAD Cable Closures, Section 631-20-0-006, Issue 1, Jun. 1981 (24 pages).

*Primary Examiner*—Laramie E. Askin
*Attorney, Agent, or Firm*—Trexler, Bushnell & Wolters, Ltd.

[57] ABSTRACT

A pedestal-type closure for use as a buried telephone cable terminal closure comprises a rear section and upper and lower front covers, each of which is formed from the same basic plastic extrusion. The covers and the rear section are secured in edge-to-edge relationship. The upper ends of the rear section and of the upper cover are formed with cooperating caps that form a venting structure for venting moisture from within the interior of the pedestal and which tend to form a barrier against the entrance of insects into the pedestal. The lower cover has a snap-on arrangement which facilitates assembly, and the rear section has spacers which facilitate mounting of the pedestal against a vertical surface, and wherein the spacers are difficult to dislodge from the pedestal, thereby inhibiting vandalism.

10 Claims, 22 Drawing Figures

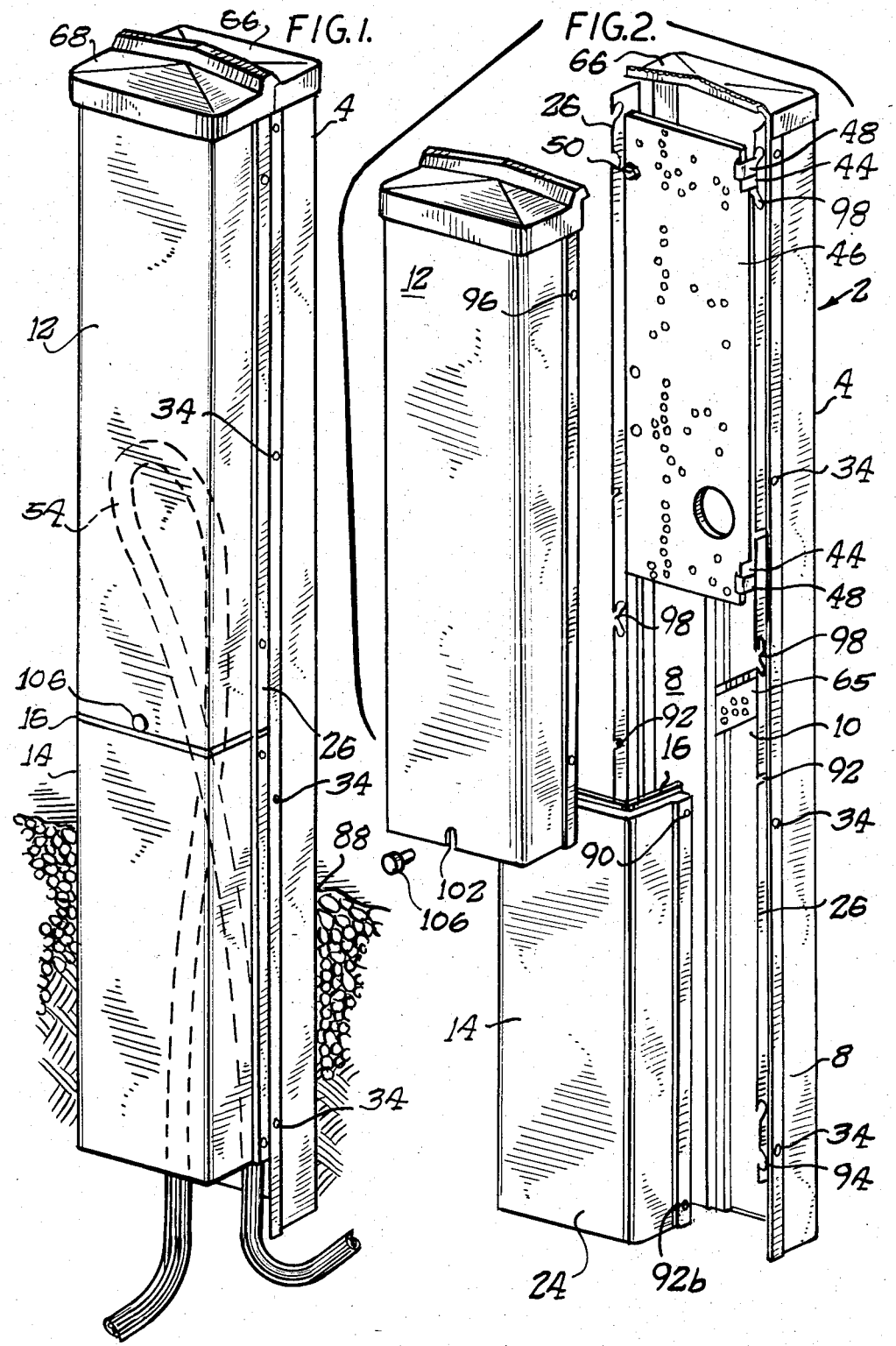

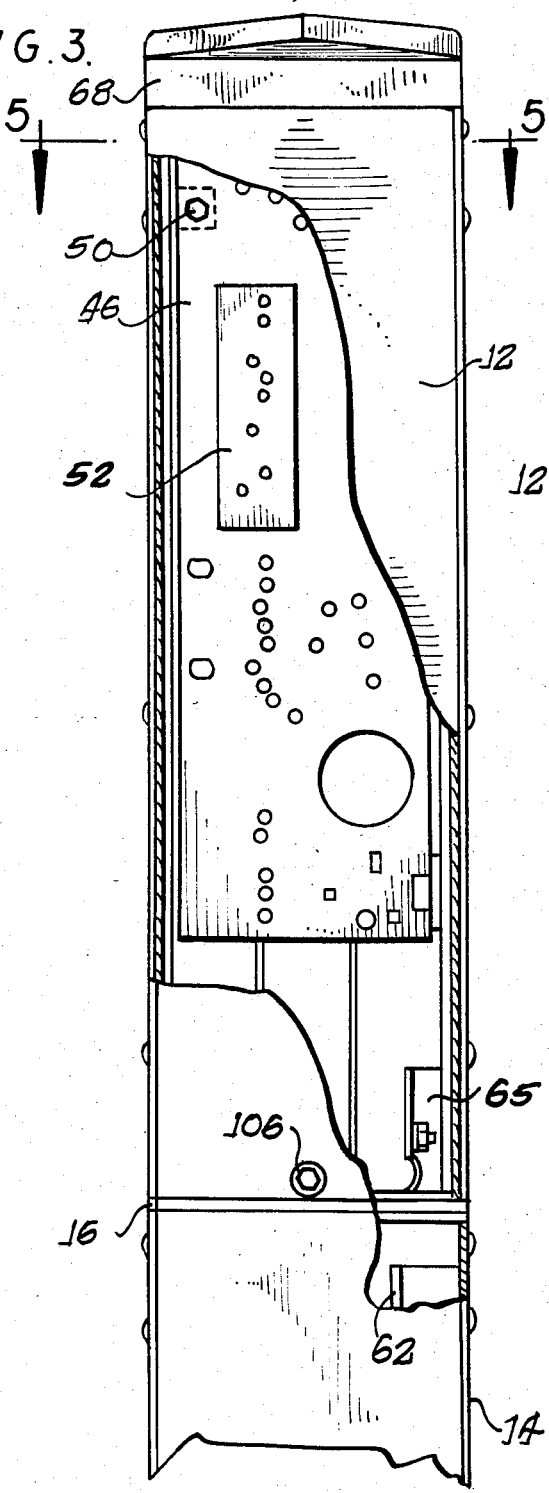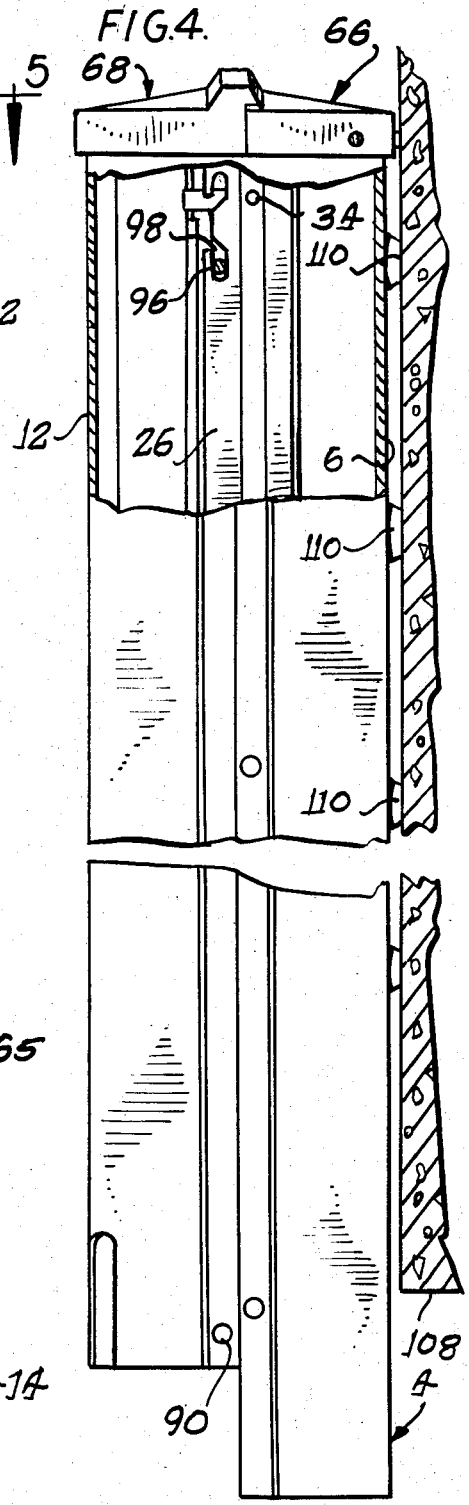

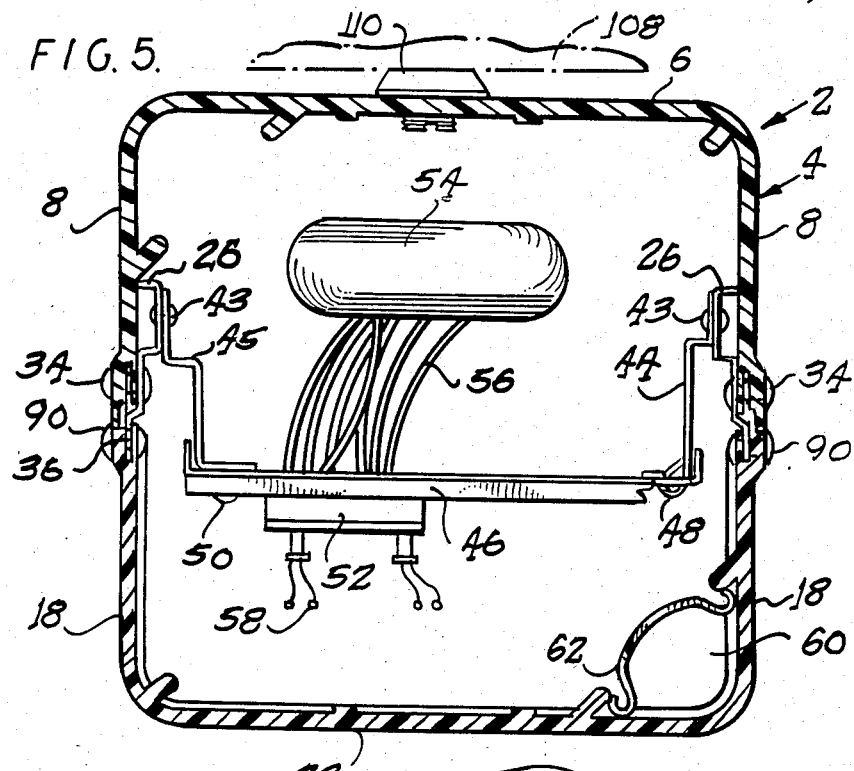
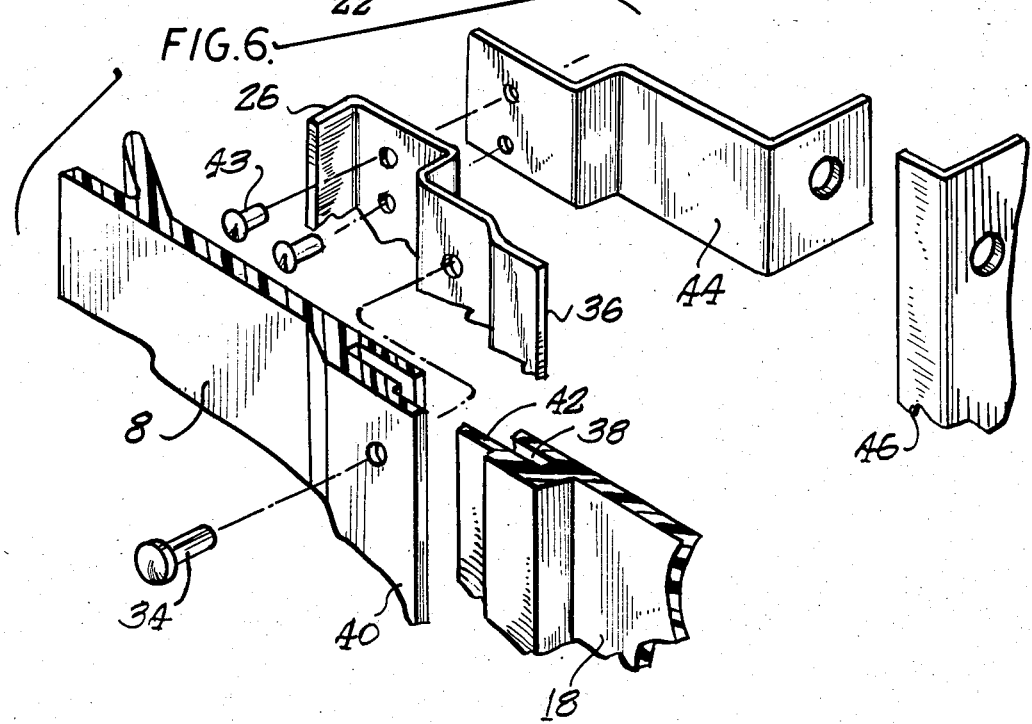

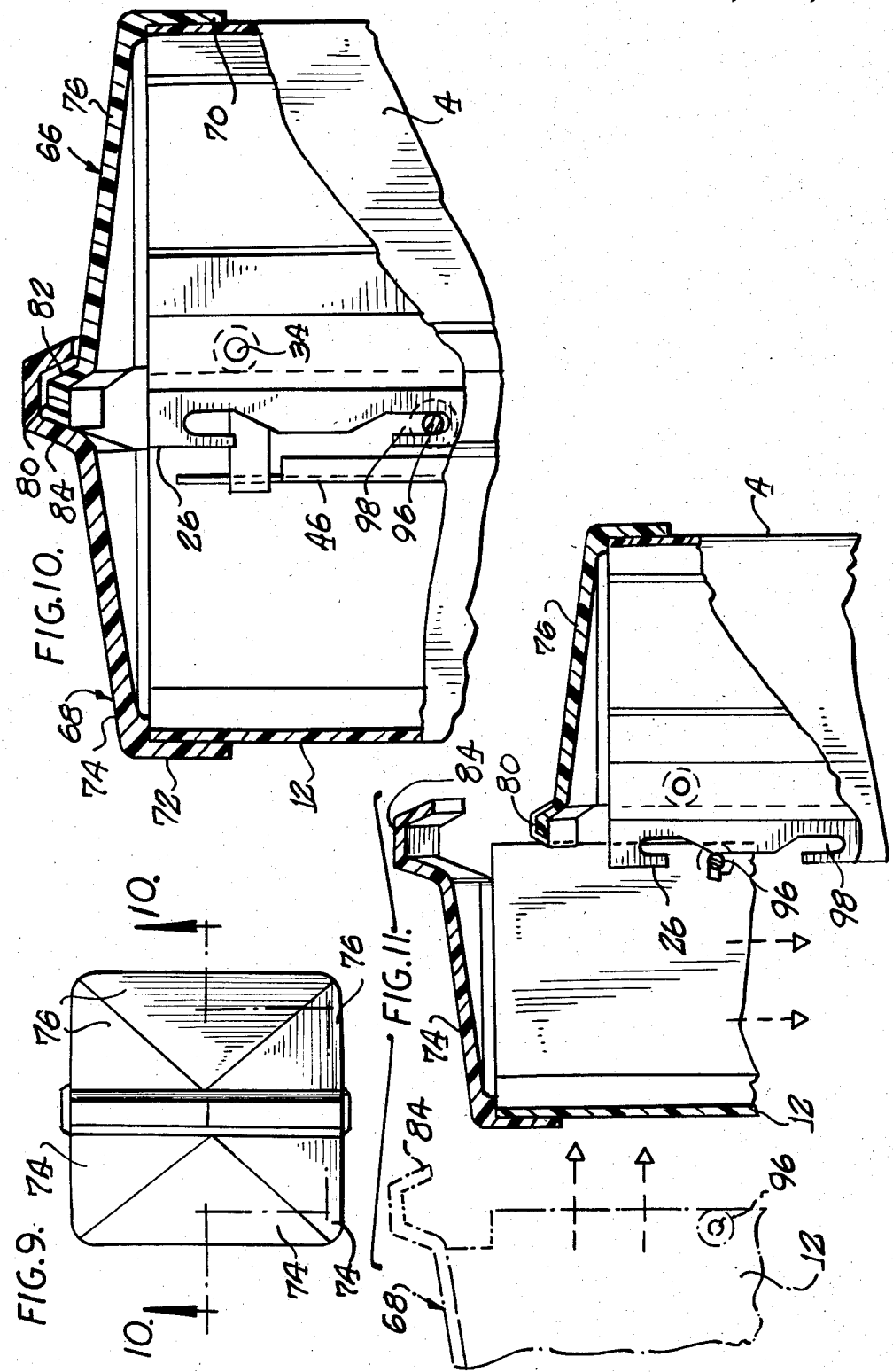

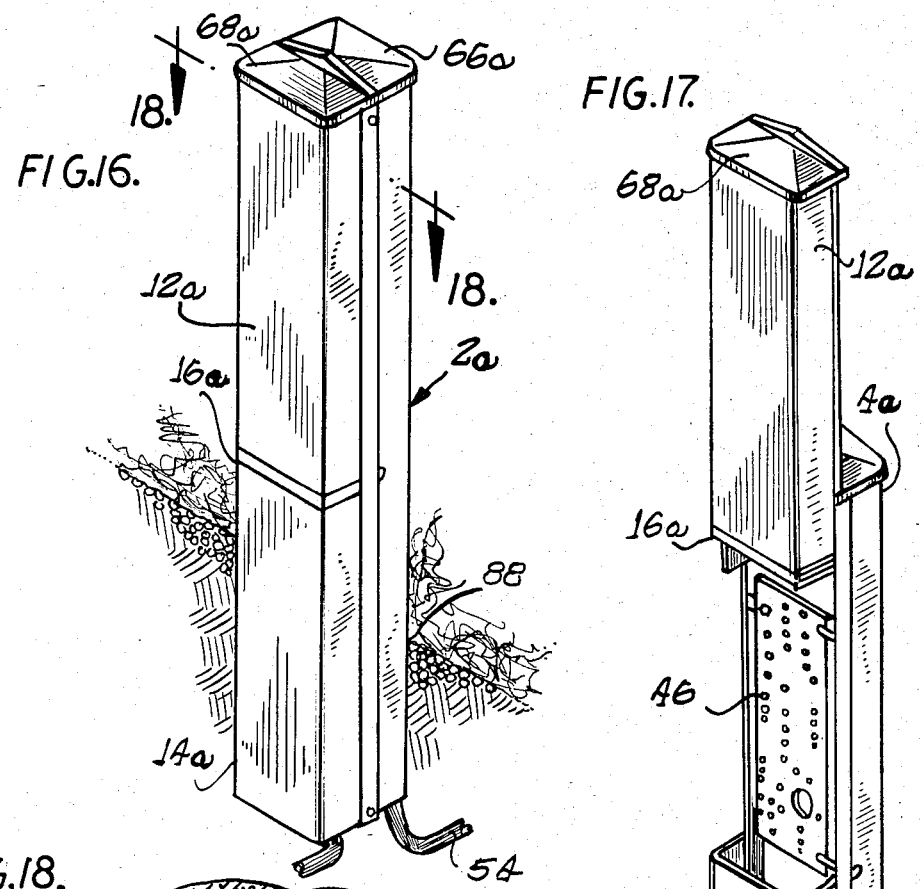
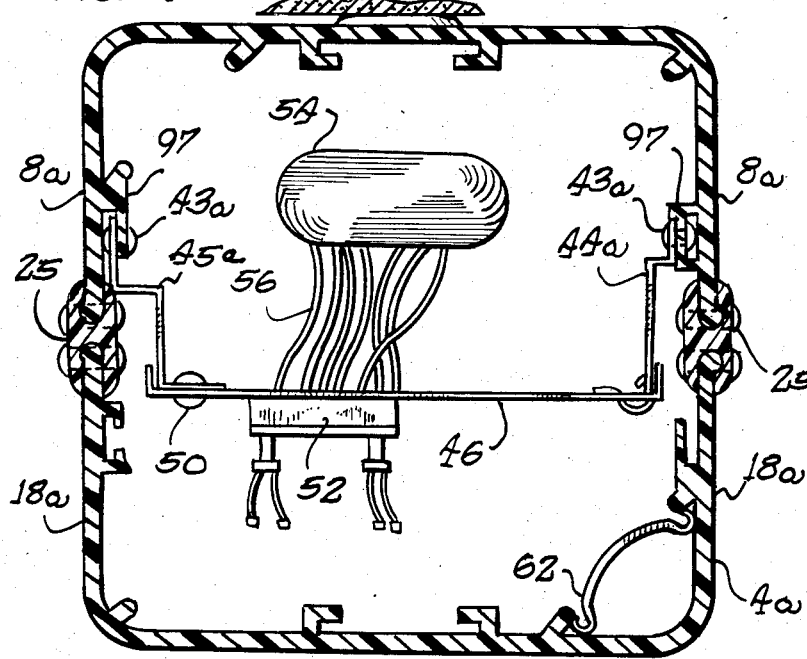

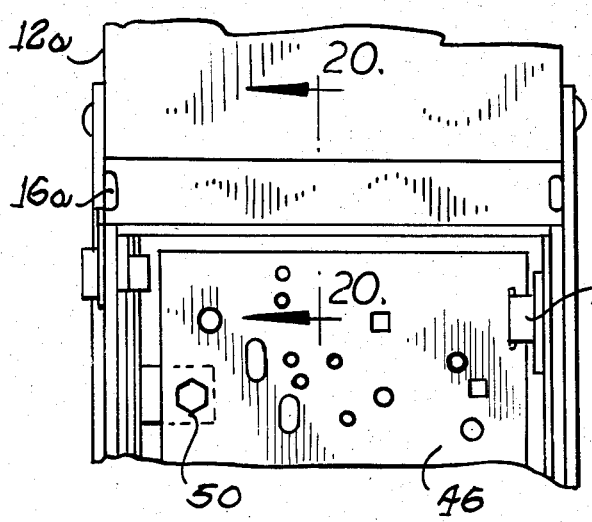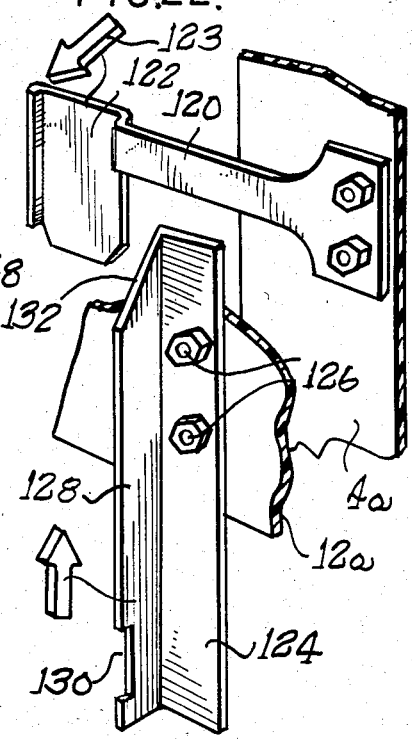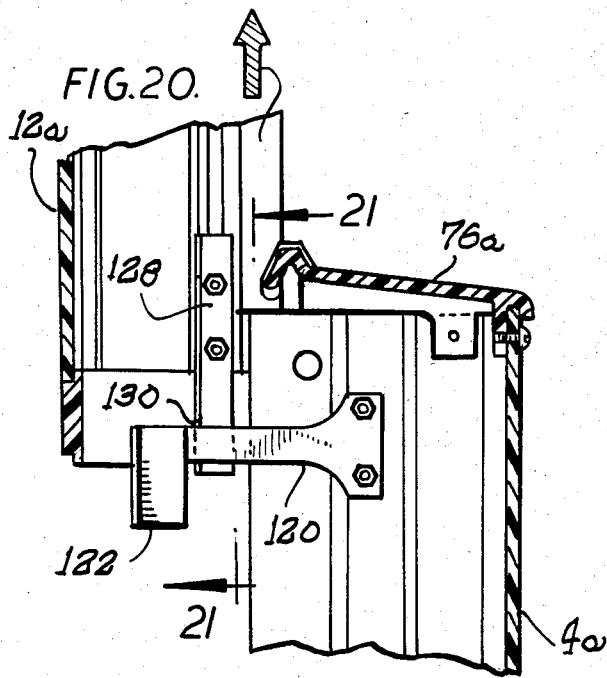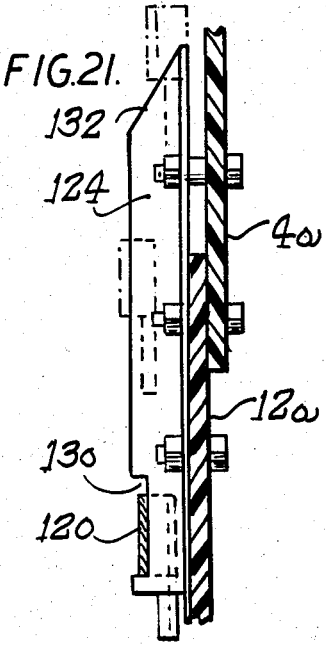

TERMINAL PEDESTAL FOR BURIED CABLE INSTALLATION

BACKGROUND OF THE INVENTION

This invention relates to enclosures for electrical termination, and more particularly to an improved enclosure for the above ground splices or terminations of a buried cable installation.

It is a common practice to employ sheltered splices or terminal connections in connection with service drops in buried cables, such as telephone and like communications cables. The enclosures for sheltering these splices are known as pedestals, and they are designed to be substantially weather-tight so as to protect the terminations from the entry of damaging winds, water, snow or insects. Moreover, the pedestal should be designed to be resistant to vandalism and at least discourage access to the pedestal by other than qualified and authorized personnel.

A known type of pedestal construction includes a three part housing that includes a rear section, together with upper and lower front cover sections, and with all three members being essentially U-shaped so that a hollow interior of the pedestal is formed. Such construction is relatively expensive, and cost reductions effected by the modified pedestal design of the present invention generally constitutes an advance in the art.

OBJECTS AND SUMMARY OF THE INVENTION

An object of this invention is to provide an enclosure for electrical terminals associated with a buried cable installation in which the rear section and the upper and lower front cover members have a common profile in that these basic parts of the pedestal may be formed relatively inexpensively by an extrusion, such as plastic, following which lengths of the extruded material may be cut for the rear section or base and the upper and lower front cover.

A further object of this invention is to provide a pedestal of the type stated in which the top cover is designed to form a series of vent passageways for venting moisture from the interior of the pedestal, while at the same time inhibiting or effectively obstructing the passage of insects and windblown matter or dust into the interior of the pedestal. Preferably the top cover is of the split cap design.

Yet another important object of this invention is to provide a pedestal of the type stated in which the back section has a series of plugs which provide spaces between the pedestal and a vertical mounting surface. The rear of the top cover tends to overhang the back of the rear section, and the plugs take up the space created by the overhang. The plugs are generally of frusto-conical shape which inhibits removal by vandals.

A still further object of this invention is to provide a form of the invention in which the bottom cover is snapped into place during installation of the pedestal. This snapping action is the result of pins on the cover that snap fit with C-slots in the vertical edges of the joining means on the back. The pin is of a shape and material, such as plastic, which tends to flex as it enters the C-slot. The arrangement eliminates attaching the cover with loose hardware and effectively prevents vertical movement when the bottom cover is mounted in place. This arrangement, in turn, provides location of the upper cover during assembly thereof with the back or rear section.

The extrusion is made from non-corrosive materials, i.e., plastics, while internal components from a conductive metal maintain electrical continuity without separate insert parts for electrical grounding. The split cap design provides the versatility of adding an aerial drop to the closure.

In accordance with the foregoing objects, the invention comprises a closure for electrical terminals associated with a buried cable installation comprising: a body having a rear section including a plastic channel having a web and a pair of legs with opposed edges defining an opening into the channel, means within the channel and integral with the plastic of the channel for supporting electrical wire termination structure, plastic front cover means for closing the opening into said channel, said front cover means comprising upper and lower cover sections, each being of a cross section that is the same size and shape as that of said rear section, and means for attaching said cover sections to said rear section with the legs of the rear section being presented respectively to the legs of the cover sections in edge-to-edge relation.

Further in accordance with the present invention, there is provided a closure of the type stated comprising a body having a rear section with an open side and front cover means for closing the sides of said rear section, said front cover means including at least one front cover section, said front cover section having an upper end with a cap section affixed thereto, a rear cap section affixed to the upper end of said rear section, the cap sections abutting and cooperating to define a cap on the upper end of said body, the abutting parts of the cap sections forming vent passageway means from the interior of the body to the exterior of the cap.

The arrangement provides an open throat construction for cable reception in that the back section is open vertically throughout its length with the front covers being removed.

Still further in accordance with the present invention, there is provided a closure having a body with a rear section including a channel having a web and a pair of legs with opposed edges defining an opening into the channel, cover means for said opening, said cover means and said rear section each having an upper end and with cap sections on said upper ends, a cap section overhanging the web on said rear section, and grommets on said web and projecting outwardly therefrom at least the amount of said overhang for enabling the grommets to serve as spacers when the closure is secured to a vertical surface with the grommets against said vertical surface.

BRIEF DESCRIPTION OF THE FIGURES

FIG. 1 is a perspective view of a closure-forming pedestal constructed in accordance with and embodying the present invention;

FIG. 2 is an exploded perspective view of the pedestal of FIG. 1 and showing the front covers removed;

FIG. 3 is a fragmentary front elevational view of the pedestal, partially broken away and in section;

FIG. 4 is a fragmentary side elevational view of the pedestal, partially broken away and in section;

FIG. 5 is a sectional view, on an enlarged scale, taken along line 5—5 of FIG. 3;

FIG. 6 is an exploded perspective, partially in section, and showing the interfit between the rear section and the front cover means, together with the joint bracket and latch bracket, which form part of the present invention;

FIG. 9 is a top plan view of the pedestal;

FIG. 10 is a fragmentary sectional view, on an enlarged scale, taken along line 10—10 of FIG. 9 and showing the upper end portion of the pedestal;

FIG. 11 is an exploded side elevational view, partially in section, and showing the manner of assembly of the upper cover with the remainder of the pedestal;

FIG. 16 is a perspective view of a closure-forming pedestal constituting a modified form of the present invention with sliding engagement of front and rear covers;

FIG. 17 is a perspective view of the pedestal similar to FIG. 16 but showing the upper front cover in its "slid-up" position;

FIG. 18 is an enlarged sectional view taken along line 18—18 of FIG. 16;

FIG. 19 is a fragmentary front elevational view in the region of the transition piece and showing the upper cover in the "up" position on the "sliding engagement" form;

FIG. 20 is a fragmentary sectional view taken along line 20—20 of FIG. 19;

FIG. 21 is a fragmentary sectional view taken along line 21—21 of FIG. 20; and

FIG. 22 is a fragmentary perspective view showing details of the latch mechanism for holding the upper cover in its "up" position.

Figure 7:
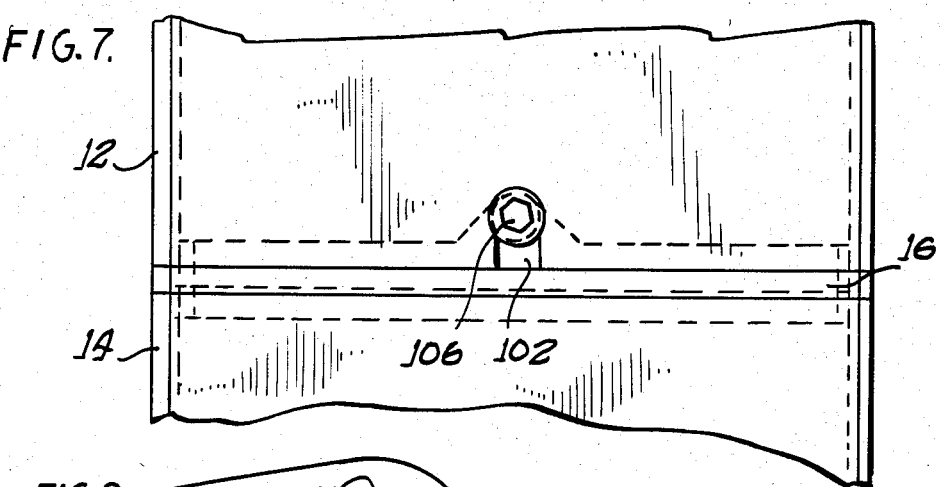
FIG. 7 is an enlarged fragmentary front elevational view in the region of the transition piece which forms part of the present invention.

In many views the cable has been omitted so as not to obstruct illustration of the interior of the pedestal.

DETAILED DESCRIPTION

Referring now in more detail to the drawings, there is shown a pedestal having a body 2 comprising a rear section 4 that defines a U-shaped channel, of plastic or other extrudable material. The channel 4 includes a backside or web 6, the margins of which merge with spaced parallel legs 8, 8, the edges of which define an opening 10 into the channel. By way of example but not of limitation, the channel may be polyvinyl chloride resin.

Figure 8:
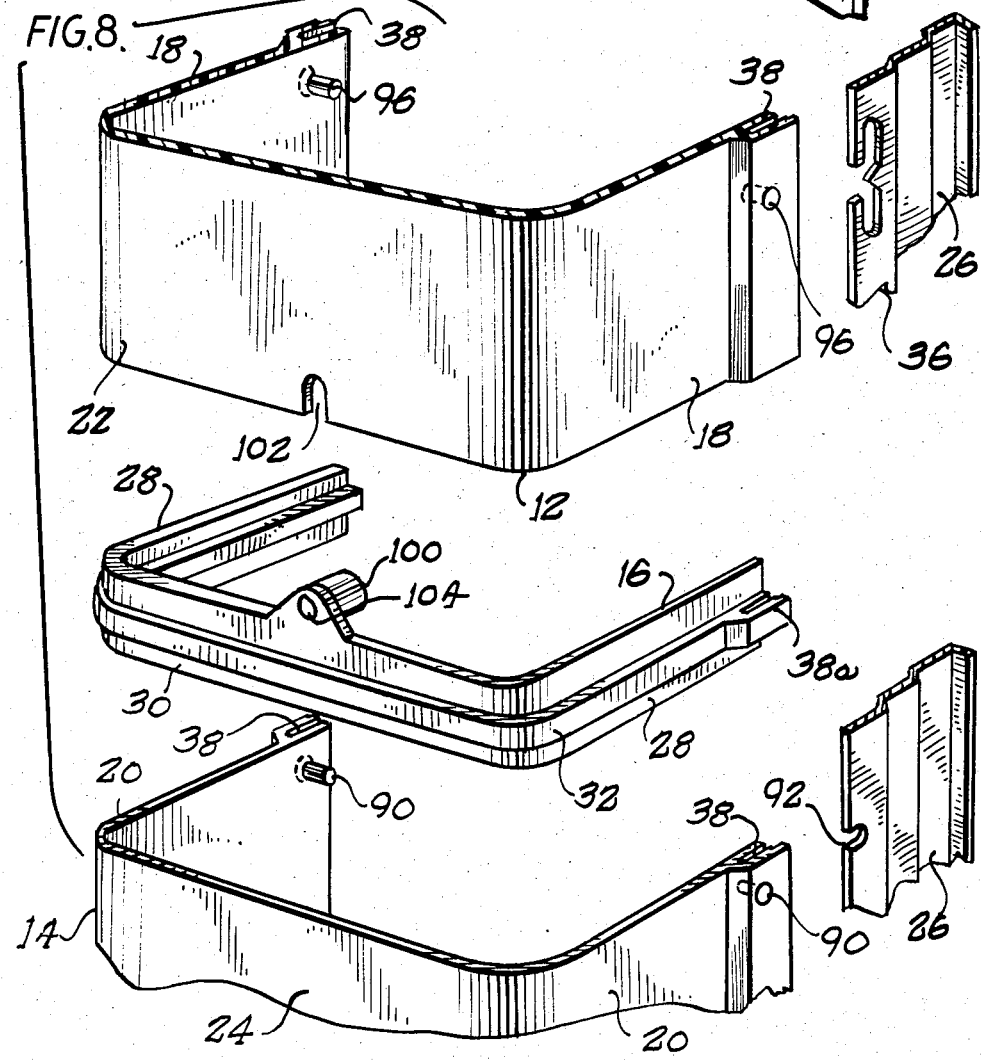
FIG. 8 is an exploded perspective view, partially in section, in the region of the transition piece and showing details of the interengagement therewith and the upper and lower covers, together with the arrangement for mounting the upper and lower covers onto the rear section.
Figure 12:
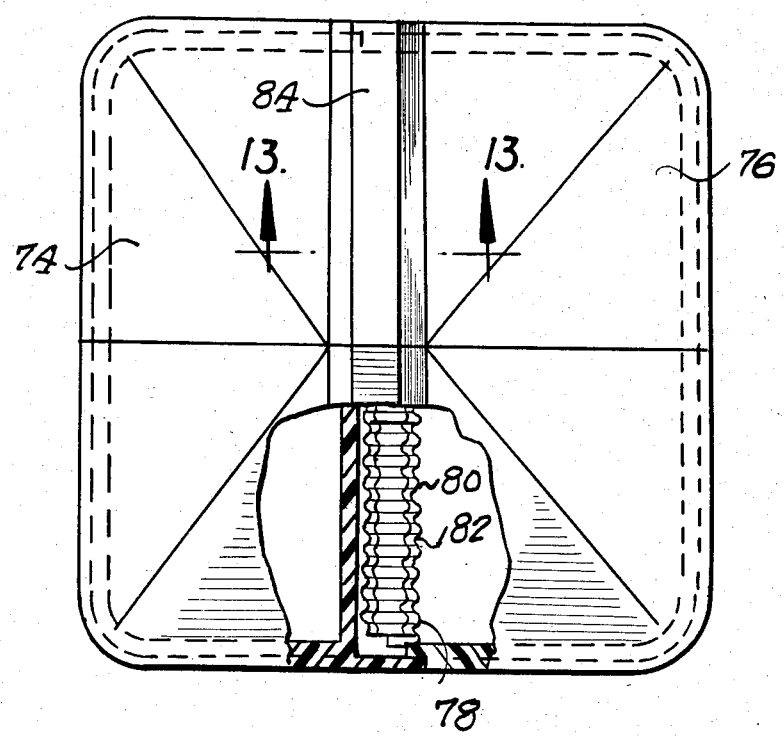
FIG. 12 is an enlarged top plan view partially in section, of the assembled rear and front cap sections.
Figure 14:
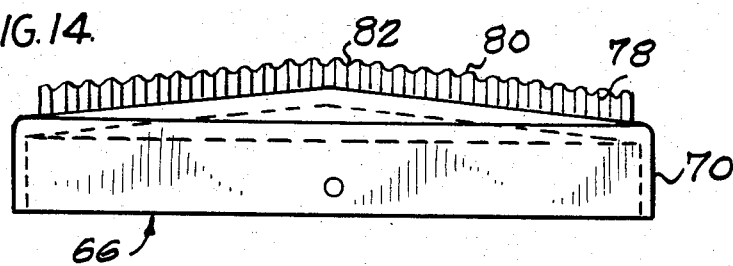
FIG. 14 is a rear elevational view of the rear cap section.
Figure 15:
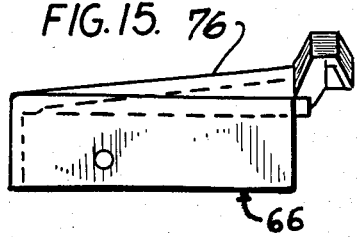
FIG. 15 is a side elevational view of the rear cap section.

The channel-shaped rear section 4 receives front cover means comprised of an upper cover 12, a lower cover 14, and a transition piece 16. The basic shapes of the rear section 4, as well as that of the upper cover 12 and lower cover 14, are the same, being formed from the same extrusion profile (cross section), whereby the cost of production of the pedestal is greatly reduced. A length of the extrusion may be cut to form the rear section 4, while shorter lengths will be cut to form the upper and lower covers 12, 14. Thus, the upper and lower covers 12, 14 have legs 18, 18 and 20, 20, respectively. Likewise, the covers 12, 14 have respective webs 22, 24 (FIG. 8). The legs 18, 18; 20, 20, respectively, assemble with the legs 8, 8 of the rear section in edge-to-edge relationship through joint brackets 26, 26, as will presently be more fully described. The transition piece 16 also is formed with legs 28, 28 (FIG. 8) and a web 30, and the transition piece telescopes within the upper and lower covers 12, 14, the covers 12, 14 being thus separated by a raised rib 32 on the transition piece and running over the legs 28 and back or web 30.

The joint brackets 26 are affixed to the legs 8, 8 in any suitable manner, such as by rivets 34, along the length of the free edges of the legs 8, 8, although adhesives or other mechanical fastening methods may be used. When the covers 12, 14 are mounted in place, the tongue portions 36 (FIGS. 6 and 8) of the joint brackets fit into slots 38 in the edges of the legs 18, 18; 20, 20. Slots 38a are similarly formed at the free edges of the legs 28, 28 of the transition piece 16. Likewise, when the covers are assembled with the rear section, as will presently be more fully described, the plastic tongues 40, 42 on the legs 18, 18; 20, 20 and legs 8, 8 overlap to facilitate alignment of the parts and rapid assembly of the covers with the rear section and to provide a cover joint.

Mounted on the joint brackets 26 and secured thereto as by rivets 43 or other mechanical fastening means, are upper and lower hinge brackets 44, 44. The hinge brackets, in turn, support a mounting plate 46 of conventional construction and which spans most of the space between the cover legs 18, 18. The mounting plate 46 is secured to upper and lower hinge brackets 44 (FIG. 2) by hinges 48, 48 which are integral with the brackets, although separate hinges could be used. As shown, one edge of the mounting plate 46 is at the hinge connection and the other edge of the mounting plate 46 is held in place by a stop screw 50 threaded into a stop bracket 45. The front of the mounting plate 46 may contain one or more electrical terminal boards 52 at which wire terminations are made in a conventional manner. Thus, wires of line pairs are taken from a cable 54 behind the mounting plate 46 and these wires 56 are disposed within the pedestal and connected to the appropriate termination point on the terminal board 52. Sevice drop lines 58 are taken off of the terminal board 52. Additional service wires may be confined in the service wire channel 60, defined in part by a member 62 subsequent to the initial installation without disturbing the gravel fill around the pedestal. The interior of the pedestal may also be provided with suitable conventional grounding structure 65 (FIG. 2).

Figure 13:
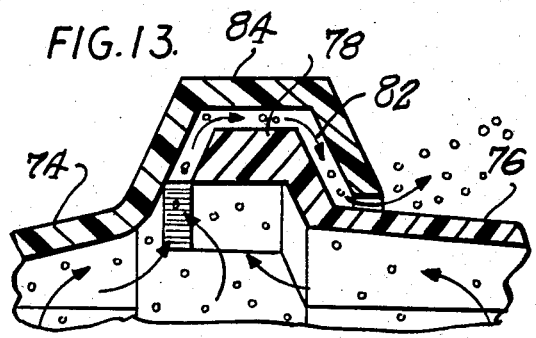
FIG. 13 is an enlarged fragmentary sectional view taken along line 13—13 of FIG. 12 and showing the venting feature of the present invention.

An arrangement is provided for venting moisture from the interior of the pedestal while at the same time making the pedestal reasonably weatherproof and forming a barrier against the migration of insects, dust and airborne particulate material into the interior of the pedestal. For this purpose, the rear section 4 and the upper cover 12 cooperate to form cap means (FIG. 12) that function as a labyrinth vent. As best seen in FIGS. 10-13, this cap means comprises a rear cap section 66 and a front cap section 68. The rear cap section and the front cap section have peripheral skirts 70, 72 which are bonded or otherwise secured to the respective front and rear section or upper cover, as the case may be. At its upper end, the skirt 72 merges with inclined, triangularly-shaped (FIG. 9) top walls 74, while at the upper end of skirt 70, there are similar inclined walls 76. At the upper end of the wall 76 is a ledge 78 having a series of ribs 80 between which are grooves 82. The continuous ribs 80 of the ledge 78 rise to a peak from opposite sides of the rear cap section 66 so that drainage through each of the grooves 82 will fall onto an inclined wall 76. At the upper end of the inclined wall 74 is a generally trapezoidal-shaped hood 84 which serves to cover the ledge 78 and in part define walls of the grooves 82. Consequently, the hood 84 constitutes a flange that abuts the ribs 80 and defines a dust-entrapping, moisture-venting labyrinth passageway, as best seen in FIG. 13, wherein the arrows indicate the vent path.

As best seen in FIG. 1, the pedestal is installed near the buried cable 54 at a ground or surface line 88, somewhat below the upper end of the lower cover 14. Because of the open throat construction referred to previously, the installation of the covers of the pedestal may generally be carried out without the necessity of loose field installation parts. More particularly, the legs 20, 20, adjacent to their free edges, are provided with pins 90 which are adapted to snap-fit into C slots 92 on the joint brackets 26 (FIGS. 2 and 8). The pins 90 are positioned near the upper ends of the lower cover 14. The lower end of the lower cover 14 has pins 92b which are adapted to be positioned in bayonet slots 94 in the joint brackets 26. Therefore, the pins 92b may be fitted into the bayonet slots 94 for allowing the lower end of the lower cover to be aligned with the rear section 4 such that the slots 38 are positioned for receiving the opposing joint bracket 26. Thereafter, the lower cover is pivoted around the axis of lower pins 92b until the pins 90 snap-fit into the C slots 92. The transition piece may be mounted on the lower cover 14 and fastened either mechanically or adhesively.

The upper cover 12 may be quickly and easily removed from and remounted onto the pedestal for servicing purposes. In mounting the upper cover 12, lower pins 96, 96 (FIGS. 8, 10, 11) on the cover 12 are first mounted in upper bayonet slots 98, 98 by movement shown in FIG. 11. Thus, the upper cover 12 is moved to a position in which the pins 96 are above the bottoms of slots 98, while at the same time the hood or flange 84 lies above the ribs 80. Thereafter, the upper cover 12 is lowered until the flange 84 and ribs 80 interengage, at which time the pins 96 are adjacent to the bottoms of the slots 98, as best seen in FIG. 10.

The transition piece 16 has a threaded boss 100 at the upper portion of the web 30. The upper cover 12 has a downwardly-opening slot 102 at its lower end which, when the cover 12 is assembled with the pedestal, is adapted to be aligned with the opening 104 in the boss 100. A screw 106 may be threaded into the boss 100 to retain the upper cover 12 in a locked position.

When mounting the pedestal adjacent to a wall 108 or like vertical surface or two pedestals back to back, it is preferred to prevent the overhang of the cap structure 66, 68 from contacting the wall 108 and thereby being stressed or damaged or to prevent unauthorized removal of the hereinafter described grommets 110 from the pedestal. For this purpose, the plastic spacer plugs or grommets 110 are mounted in vertically-spaced relationship on the rear section 4 and are of a dimension such that there is clearance between the rear cap section 66 and the adjacent vertical wall 108 when the grommets are flush against the wall 108. Furthermore, it will be noted from FIGS. 4 and 5 that the grommets 110 exhibit a frusto-conical shape with a large cone angle, thereby making the grommets difficult to remove from the outside of the shape. The arrangement affords greater flexibility in the selection of bolt holes to be used as compared to limited fixed mounting arrangements having preformed holes without grommets.

A modified form of pedestal is shown in FIGS. 16-22 in which like reference numerals, as compared to FIGS. 1-15, indicate parts in FIGS. 16-22. Where the parts are comparable but are modified, they are identified by the same reference numerals as in FIGS. 1-15, except followed by the letter "a".

The pedestal body 2a comprises a rear section 4a and upper and lower covers 12a, 14a. A transition piece 16a separates the upper and lower cover. As in the case of the previously described pedestal, the basic cross sections of the rear section 4a and the upper and lower covers 12a, 14a are the same, being extruded and cut to length, as desired.

Within the pedestal, the brackets 45a, 45a are secured to the rear section 4a by rivets 43a, 43a. Additionally, the joint brackets are replaced with integral extruded attachment ledges 97, 97. Secured to the free edges of the rear section legs 8a, 8a are slide-joint brackets 25, 25 whereby the upper cover member 12a may be mounted to slide vertically to open and close the pedestal. Thus, the slide-joint brackets 25, 25 provide vertical slide channels for the legs 18a, 18a of the upper cover 12a.

Like the previously described form of the invention, the upper end of the rear section 4a and that of the upper cover 12a have cap sections 66a, 68a for venting the pedestal with a rib and groove venting arrangement.

Additionally, the upper cover is held in its "up" or open, position by an automatic latch mechanism best shown in FIGS. 19-22. This latch mechanism includes a spring latch 120 which is joined to the rear section 4a and which contains a finger plate 122 for operating the latch 120. The upper cover 12a has a catch plate 124 mounted thereon as by screws 126 or other adjustment means. The catch plate 124 has a laterally-projecting flange 128 having a recess or catch notch 130 therein. When the upper cover 12a is elevated as by moving it in the direction of the arrows in FIGS. 20 and 22, the cover 12a will ultimately reach a point wherein the camming edge 132 on the catch plate 124 engages the spring latch 120. Further upward movement of the cover 12a finally causes the spring latch 120 to snap into the notch 130. The upper cover 12a is now held in its upward position. For lowering the cover 12a, the plate 122 may be pressed inward slightly in the direction of arrow 123 to remove the latch 120 from the notch 130, thereby permitting the cover 12a to be lowered.

I claim:

1. A closure for electrical terminals associated with a buried cable installation comprising: a body having a rear section including a plastic channel having a web and a pair of legs with opposed edges defining an opening into the channel, means within the channel and integral with the plastic of the channel for supporting electrical wire termination structure, front cover means for closing the opening into said channel, said front cover means comprising upper and lower front cover sections, each being of a cross-section that is the same cross-sectional profile as that of said rear section, means for attaching said cover sections to said rear section with the legs of the rear section being presented respectively to the legs of the cover sections, cap means at the upper end of said body, said cap means comprising a rear cap section on said rear section and a front cap section on said front cover means, and cooperating means on said front and rear cap sections that overlap and form a vent from the interior of the body to externally thereof, said cooperating means comprising a ledge on one of said cap sections and a hood on the other of said cap sections, said hood overlying the ledge, the ledge rising to a peak from opposite sides of its cap section.

2. A closure for electrical terminals associated with a buried cable installation comprising: a body having a rear section including an extruded plastic channel having a web and a pair of legs with opposed edges defining an opening into the channel, means within the channel and integral with the plastic of the channel for supporting electrical wire termination structure, front cover means for closing the opening into said channel, said front cover means comprising upper and lower front cover sections, each being of a cross-section that is the same cross-sectional profile as that of said rear section, means for attaching said cover sections to said rear section with the legs of the rear section being presented respectively to the legs of the cover sections, brackets on the legs of said rear section, and means on the lower front cover section for snap-fitting engagement with said brackets.

3. A closure according to claim 2 in which said means for snap-fitting engagement on said lower front cover section comprises flexible pins and said brackets have notches, the snap-fitting engagement being effected by said flexible pins engaging said notches.

4. A closure for electrical terminals associated with a buried cable installation comprising: a body having a rear section including an extruded plastic channel having a web and a pair of legs with opposed edges defining an opening into the channel, means within the channel and integral with the plastic of the channel for supporting electrical wire termination structure, front cover means for closing the opening into said channel, said front cover means comprising upper and lower front cover sections, each being of a cross-section that is the same cross-sectional profile as that of said rear section, means for attaching said cover sections to said rear section with the legs of the rear section being presented respectively to the legs of the cover sections, said cover sections having slots, and said last-mentioned means being brackets on said rear section legs and having edges which fit within said slots.

5. A closure for electrical terminals associated with a cable installation comprising: a body having a rear section with an open side and front cover means for closing said open side, said front cover means including at least one front cover section, said front cover section having an upper end with a front cap section affixed hereto, a rear cap section affixed to the upper end of said rear section, the cap sections abutting and cooperating to define a cap for the upper end of said body, the abutting parts of the cap sections forming vent passageway means from the interior of the body to the exterior of the cap, and in which said cap sections have surfaces that are inclined to the vertical when the closure is installed in its normal upright position, said surfaces being positioned to receive and drain away from the closure condensate discharged from said vent passageway means.

6. A closure for electrical terminals associated with a cable installation comprising: a body having a rear section with an open side and front cover means for closing said open side, said front cover means including at least one front cover section, said front cover section having an upper end with a front cap section affixed thereto, a rear cap section affixed to the upper end of said rear section, the cap sections abutting and cooperating to define a cap for the upper end of said body, the abutting parts of the cap sections forming vent passageway means from the interior of the body to the exterior of the cap, and in which said abutting cap sections have overlapping flanges, one of said flanges having ribs and the other flange abutting the ribs to define a labyrinth formed of a series of vent passageways across the top of said cap, and further having inclined top surfaces on the cap to drain away condensate vented from the vent passageways.

7. A closure according to claim 2 in which said front cover means also includes another cover section, the two cover sections and the rear section being extruded such that the cover means and rear section may be lengths of the same extrusion.

8. A closure for electrical terminals associated with a cable installation comprising: a body having a rear section with an open side and front cover means for closing said open side, said front cover means including at least one front cover section, said front cover section having an upper end with a front cap section affixed thereto, a rear cap section affixed to the upper end of said rear section, the cap sections abutting and cooperating to define a cap for the upper end of said body, the abutting parts of the cap sections forming vent passageway means from the interior of the body to the exterior of the cap, and in which said rear section includes a pair of legs joined by a web and where said rear cap section overhangs said web, said web having grommets thereon which project outwardly from the web at least the amount of said overhang.

9. A closure for electrical terminals associated with a cable installation comprising: a body having a rear section including a channel having a web and a pair of legs with opposed edges defining an opening into the channel, cover means for said opening, said cover means and said rear section each having an upper end and with cap sections on each said upper end, said cap section on the upper end of the rear section overhanging said web on said rear section, and removable grommets on said web and projecting outwardly therefrom at least the amount of said overhang for enabling the grommets to serve as spacers when the closure is secured to a vertical surface with the grommets against said vertical surface.

10. A closure according to claim 9 in which each grommet on the outside of the web on which it is mounted is generally frusto-conical in shape and with an apex angle being relatively large to inhibit grasping.

* * * * *